(12) United States Patent
Greenidge et al.

(10) Patent No.: US 7,088,574 B2
(45) Date of Patent: Aug. 8, 2006

(54) MOUNTING APPARATUS FOR ELECTRONIC DEVICES

(75) Inventors: Colin D. Greenidge, Thousand Oaks, CA (US); Jason W. Pegler, Newbury Park, CA (US); Kwanghyun Choi, San Dimas, CA (US)

(73) Assignee: Thales Navigation, Inc., Santa Clara, CA (US)

( * ) Notice: Subject to any disclaimer, the term of this patent is extended or adjusted under 35 U.S.C. 154(b) by 0 days.

(21) Appl. No.: 10/606,277

(22) Filed: Jun. 26, 2003

(65) Prior Publication Data

US 2004/0264115 A1 Dec. 30, 2004

(51) Int. Cl.
  *G06F 1/16* (2006.01)
(52) U.S. Cl. ............ 361/679; 361/719; 165/80.3; 248/921
(58) Field of Classification Search ........ 361/679–687, 361/724–727, 719; 174/16.3; 165/80.3, 165/185; 312/223.1–223.6; 248/917–923
See application file for complete search history.

(56) References Cited

U.S. PATENT DOCUMENTS

| 5,816,554 | A  | * | 10/1998 | McCracken | 248/346.01 |
| 6,002,374 | A  | * | 12/1999 | Nicholas | 343/725 |
| 6,449,157 | B1 | * | 9/2002 | Chu | 361/704 |
| 6,596,374 | B1 | * | 7/2003 | Adjeleian | 428/131 |
| 6,618,241 | B1 | * | 9/2003 | Bang | 361/681 |
| 2004/0114313 | A1 | * | 6/2004 | Mata et al. | 361/679 |
| 2005/0151367 | A1 | * | 7/2005 | Packard et al. | 281/21.1 |

* cited by examiner

*Primary Examiner*—Hung Van Duong
(74) *Attorney, Agent, or Firm*—Lowe Hauptman & Berner, LLP

(57) ABSTRACT

The present invention relates to a mounting apparatus for electronic device which is conformable to a surface contour of a support surface. The invention is directed to a mounting apparatus having a base with a deformable gel including weights and a support structure.

22 Claims, 9 Drawing Sheets

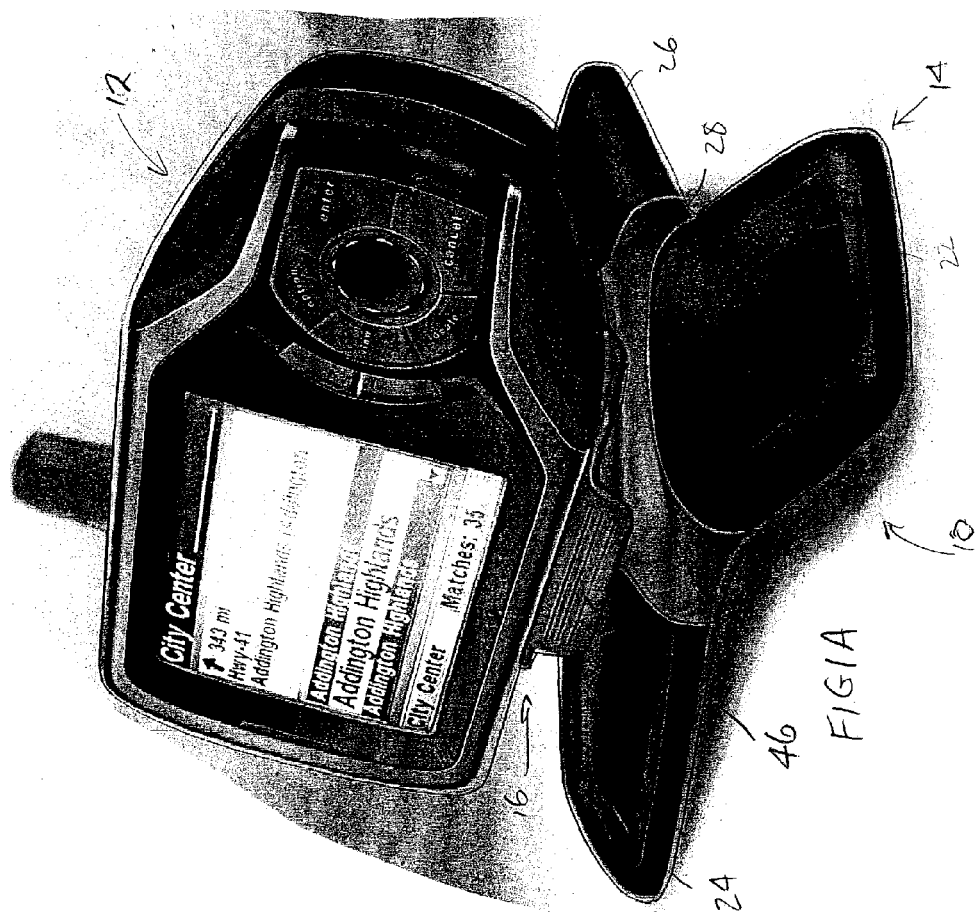

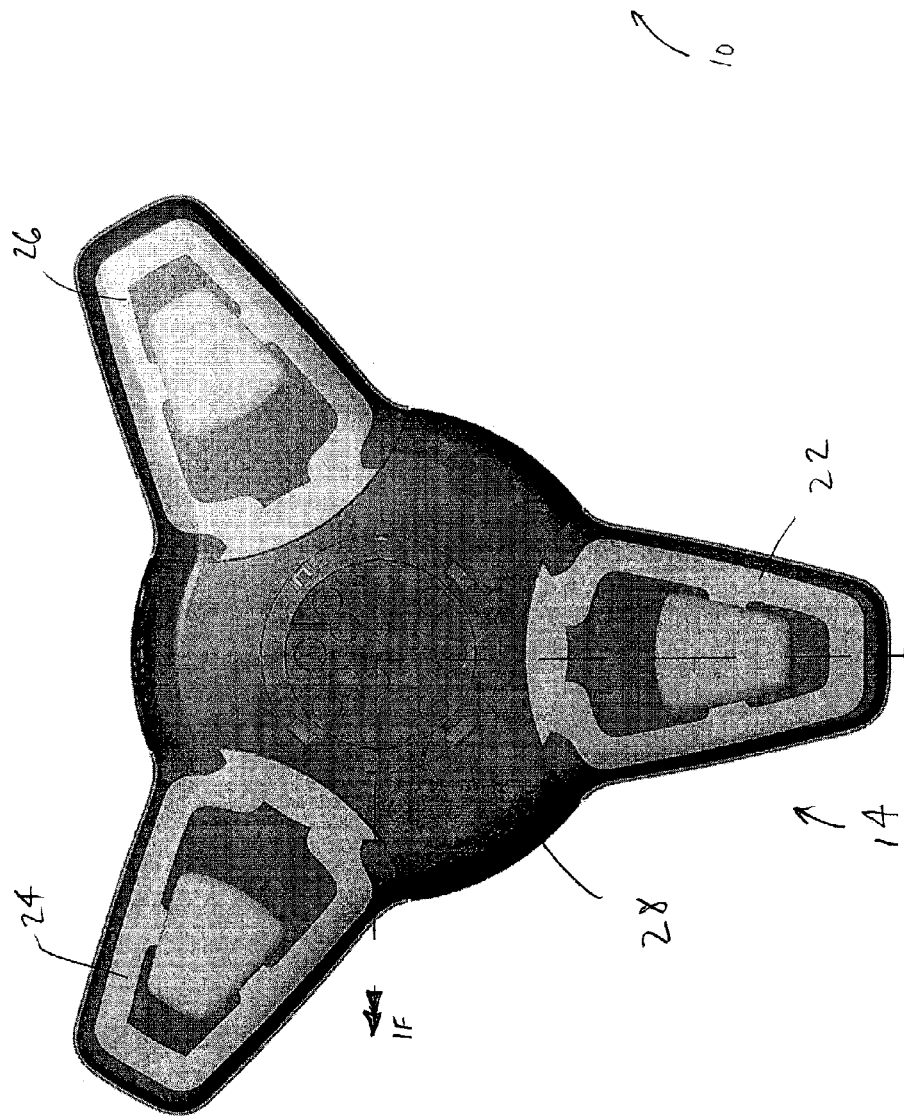

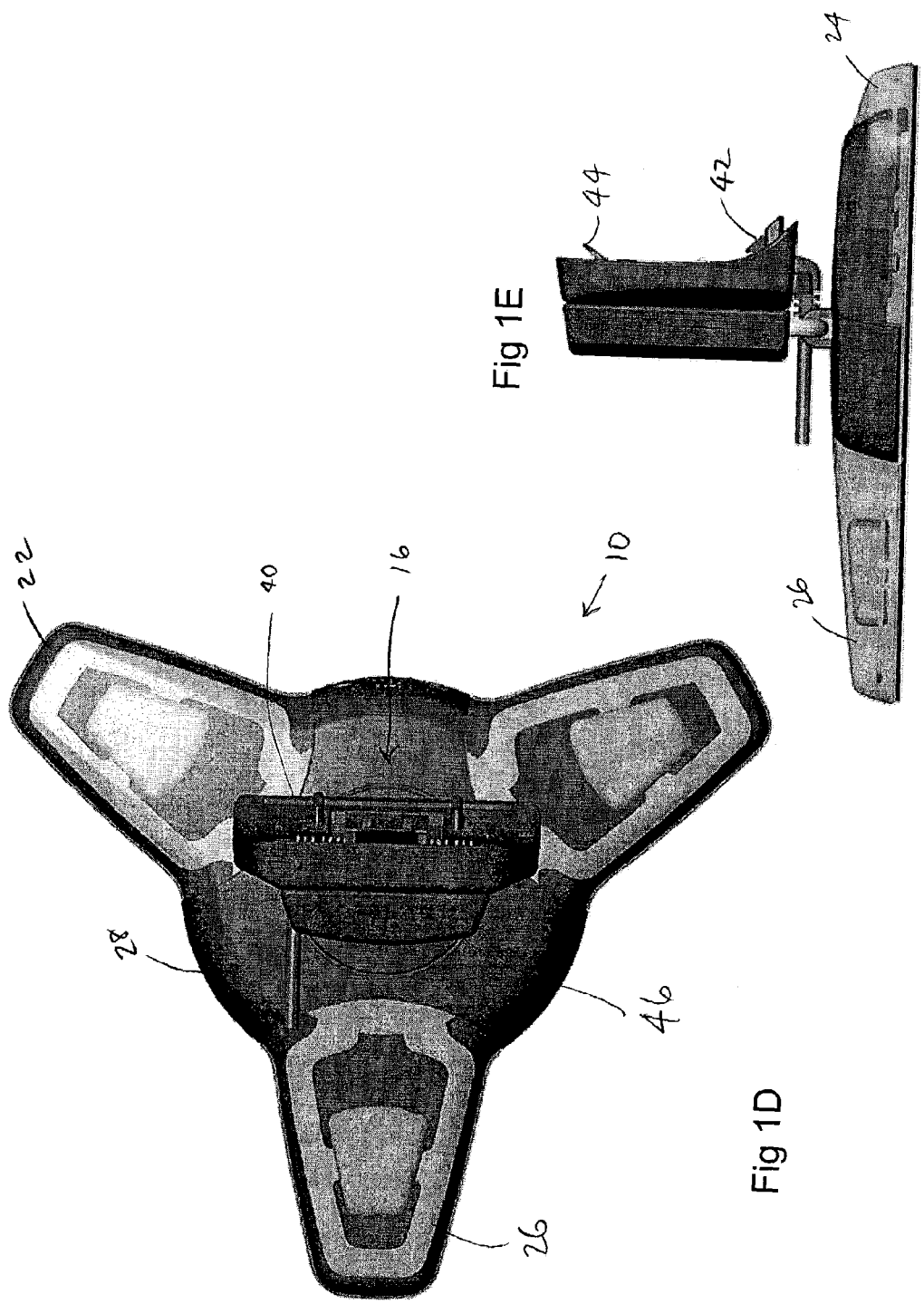

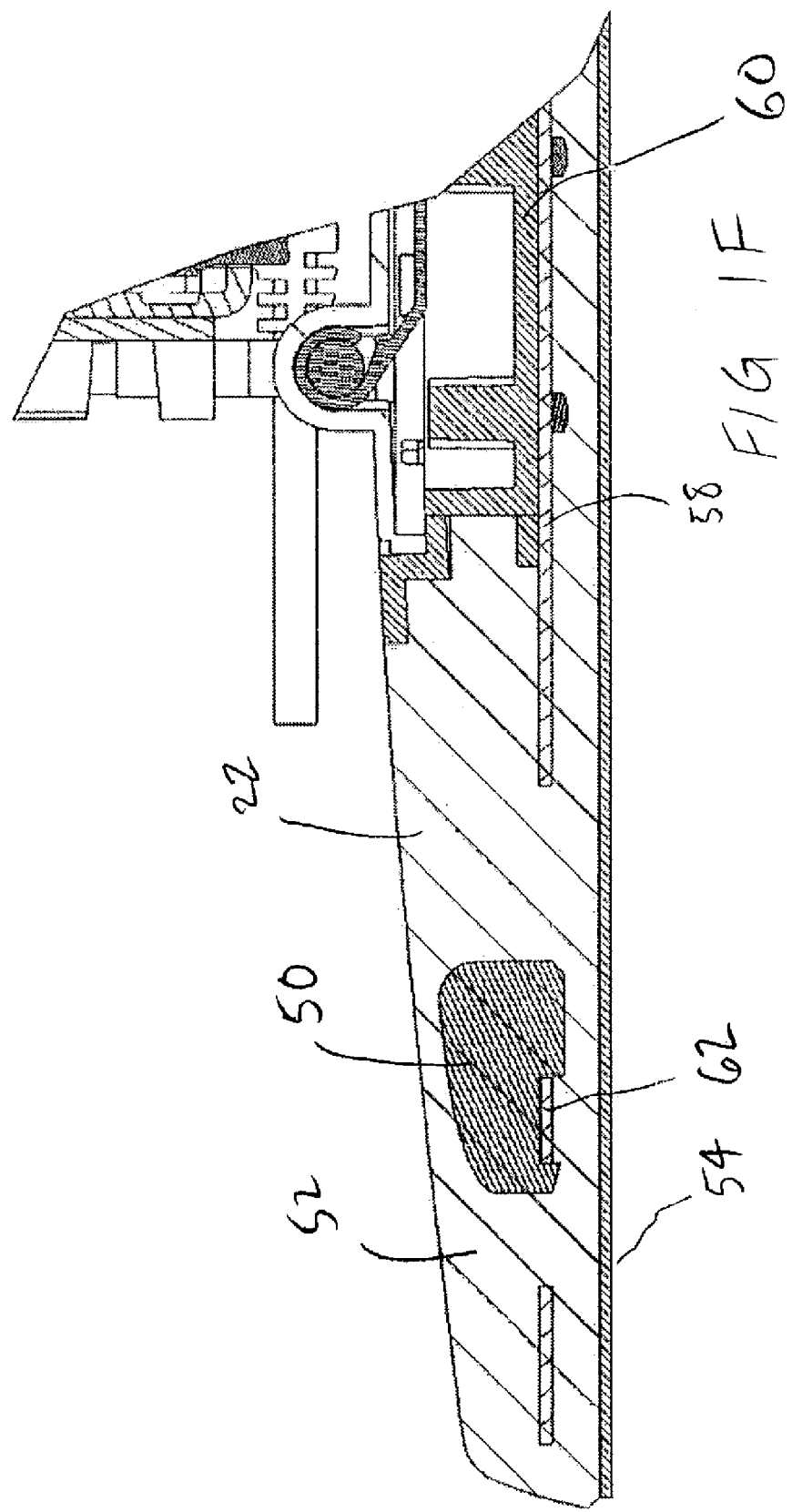

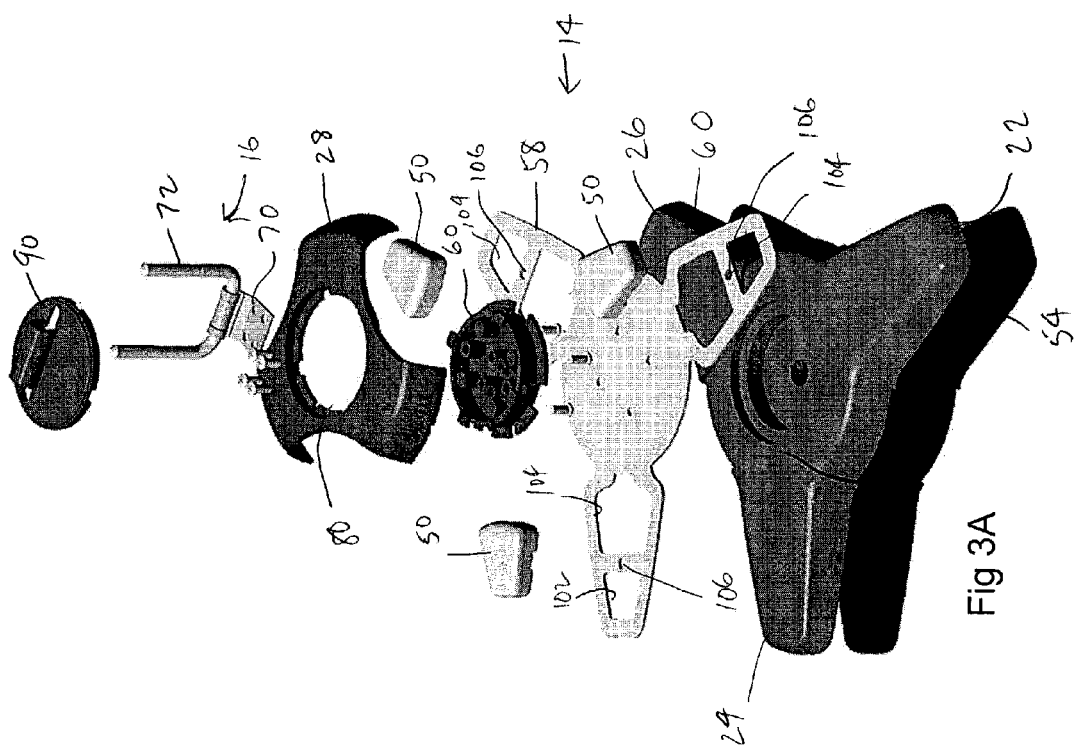

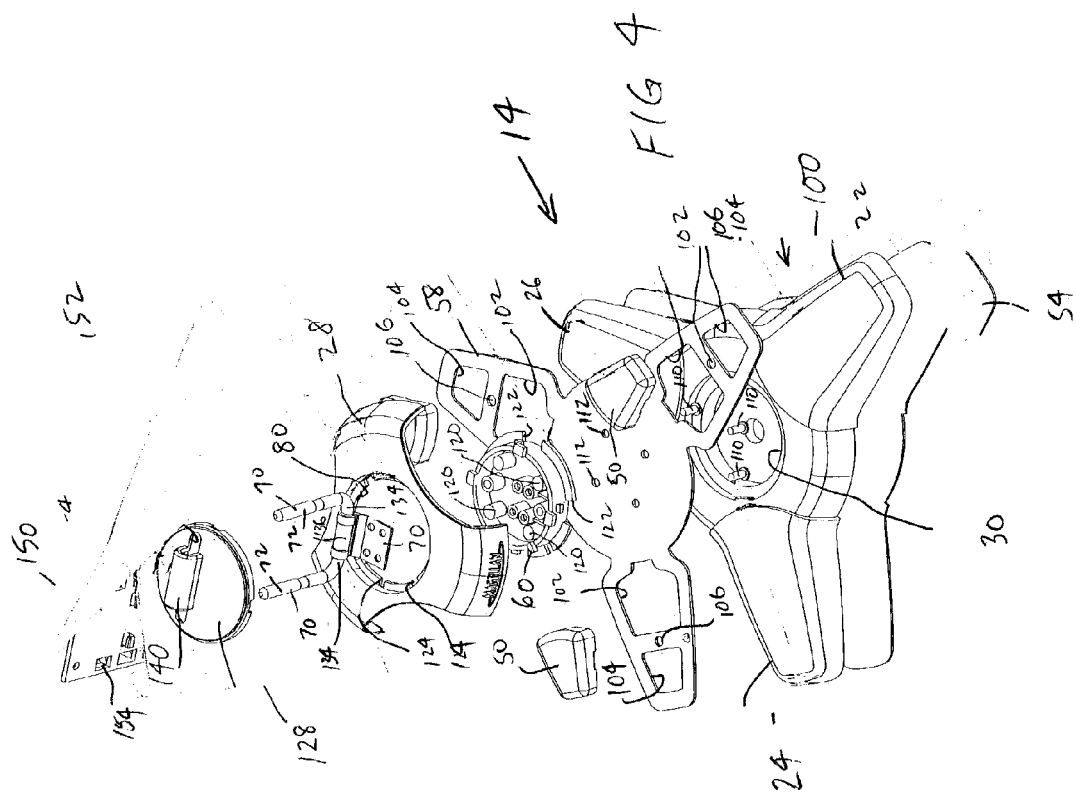

MOUNTING APPARATUS FOR ELECTRONIC DEVICES

FIELD OF THE INVENTION

The invention relates to a mounting apparatus for electronic device. More particularly, the invention relates to a mounting apparatus for electronic device which is conformable to a surface contour of a support surface. Even more particularly, the present invention is directed to a mounting apparatus having a base with a deformable gel including weights and a support structure.

BACKGROUND ART

The use of electronic devices in vehicles has increased in recent years. For example, it is increasingly more common to see electronic devices such as global positioning satellite devices, portable telephones, radios and personal digital assistants (PDA's) mounted within vehicles either permanently or in a manner such that the device may be portable. Many of these devices have a screen which visibly communicates information to the user. Thus, it is advantageous to be able to adjust the angle of device to provide maximum viewing capability to the user. The portable device further is advantageous in that can be taken from the vehicle and used outside of the vehicle, thus adding value to the device.

The mounting of devices within vehicles presents a number of problems. For example, it is difficult to mount an electronic device in a vehicle without causing damage to the surface to which it is mounted, for example, the dashboard or floor. It is particularly disadvantageous to mount the device with screws or permanent fasteners. Further, it is advantageous not to use tools to mount the device.

One attempt to satisfy the above disadvantages and advantages is disclosed in U.S. Pat. No. 6,439,530 B1 ('530 patent), issued Aug. 27, 2002. In the '530 patent, a mounting apparatus for an electronic device comprises a receiving member in the base. The base, disadvantageously, uses pellets as a weight to form the malleable section. The pellets, if the device is damaged, would be difficult to put back together. Also the device is complex to manufacture. The pellets have to be sewn into a bag. Further, the fabric used to hold the pellets is hard to keep clean, can be bleached and is flammable.

DISCLOSURE OF THE INVENTION

It is, therefore, an object of the invention to provide an electronics mounting apparatus which has a uni-body construction.

It is another object to the invention to provide a base having weights in the uni-body construction.

It is yet another object of the invention to provide a uni-body construction which is relatively simple to assemble, and avoids the potential to break apart and create a mess.

These and other objects are achieved by a mounting assembly for holding the electronic device and a base that includes a lower portion mountable to the surface and an upper portion attached to the amount wherein the base includes weights, a gel portion, and a mat to conform to the surface.

The foregoing and other objects are achieved by a mounting assembly for holding the electronic device and a base that includes a lower portion mountable to the surface and an upper portion attached to the amount wherein the base includes weights, a gel portion, and a mat to conform to the surface, wherein the base has a uni-body construction and a mount assembly is pivotable.

The foregoing and other objects are achieved by a mounting assembly for holding the electronic device and a base that includes a lower portion mountable to the surface and an upper portion attached to the amount wherein the base includes weights, a gel portion, and a mat to conform to the surface, wherein the base has a uni-body construction and a mount assembly is pivotable and wherein the base includes a metal support sheet which extends throughout the base.

Still other objects and advantages of the present invention will become readily apparent to those skilled in the art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings are to be regarded as illustrative in nature and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 1A is a perspective view of an electronics mounting apparatus according to the present invention having an electronic device mounted to an electronics device;

FIG. 1B is a top view of the electronics mounting apparatus with the electronics device omitted;

FIG. 1C is a side view of FIG. 1B;

FIG. 1D is a top view, similar to FIG. 1B, with the hinge assembly depicted;

FIG. 1E is a side view of FIG. 1D;

FIG. 1F is a cross sectional view taken along line 1F—1F in FIG. 1B;

FIG. 3A is an exploded view of the mounting apparatus of FIG. 2A;

FIG. 4 is a more detailed exploded view of the mounting apparatus of FIGS. 2A and 3A.

BEST MODE FOR CARRYING OUT THE INVENTION

Figure 2A:
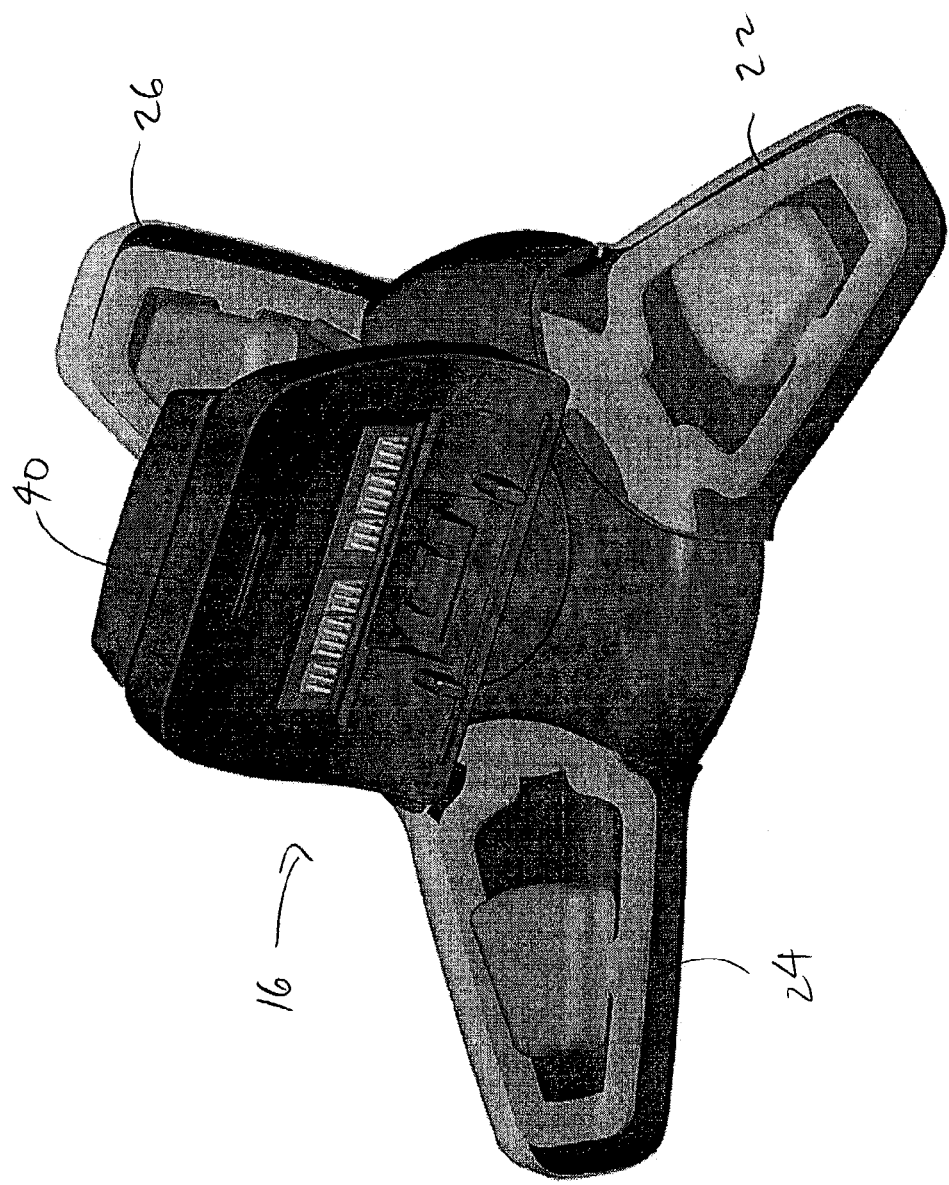
FIG. 2A is a prospective view, similar to FIG. 1A, of the mounting apparatus according to the present invention with the electronics device omitted.

Referring first to FIGS. 1A–1E, an electronics mounting apparatus 10 is illustrated which is constructed in accordance with the principles of the present invention. It should be understood that the electronics mounting apparatus 10 is depicted in an upright orientation in the figures and it should be understood that the use of the invention is not limited to the upright orientation depicted but that the present invention can be used in many orientations. Thus, the use of terms such as "downwardly", "upwardly", "left", "right", etc., as used herein is only for purposes of convenience of description and those terms should be construed in the relative sense. The electronics mounting apparatus 10 in FIG. 1A is holding an electronics device 12. The electronics device 12 is shown as a GPS system but can be any type of electronics device including, for example, a TV, a computer, or the like.

In its most basic configuration, apparatus 10 includes a base assembly 14 and a hinge assembly 16. The base 10 is capable of shaping to the contour of a surface, as more fully described below. The hinge assembly 16 may be removably or fixedly mounted to the base 14 by any number of means known in the art so long as the hinge assembly 16 is adequately supported on the base 14 when an electronic device 12 is mounted to the hinge assembly 16.

As illustrated in FIGS. 1A–1E, the electronics mounting apparatus includes the base 14. The base 14 has three toes 22, 24, 26 equally circumferentially spaced from each other. A mounting cover 28 is mounted between toes 22, 24, 26. The mounting cover 28 has a recess 30 centrally located as illustrated in FIGS. 1D–1E. The hinge assembly 16 is mounted above the recess 30 and is pivotable. The hinge assembly 16 has a curved receiving member 40 which has a lower tab 42 an upper tab 44 for retaining the electronic device 12. Returning to FIG. 1A, the electronics device 12 can be removed from the hinge assembly 16 by the user pressing on and tab 46 which is located below the electronics device 12 in FIG. 1A.

As illustrated in FIG. 1F, each toe 22, 24, 26 includes a metal weight 50, a gel portion 52, a rubber mat 54 and the centrally located anchor post which 60 which contains the recess 30. The rubber mat 54 is optional. The alloy armature 58 extends almost to the end of each toe 22, 24 and 26 and through the central portion of the base 14. The mounting cover 28 is positioned between the three gel portions 52 of each toe 22, 24, 26. Each metal weight 50 is located at a central portion 62 of the alloy armature 58. The metal weights are insert molded along with the alloy armature 58 by the gel portion 52. The anchor post 60 is positioned above the central portion of the alloy armature 58. The hinge assembly 16 includes integral power/data connections (not shown).

Figure 2B:
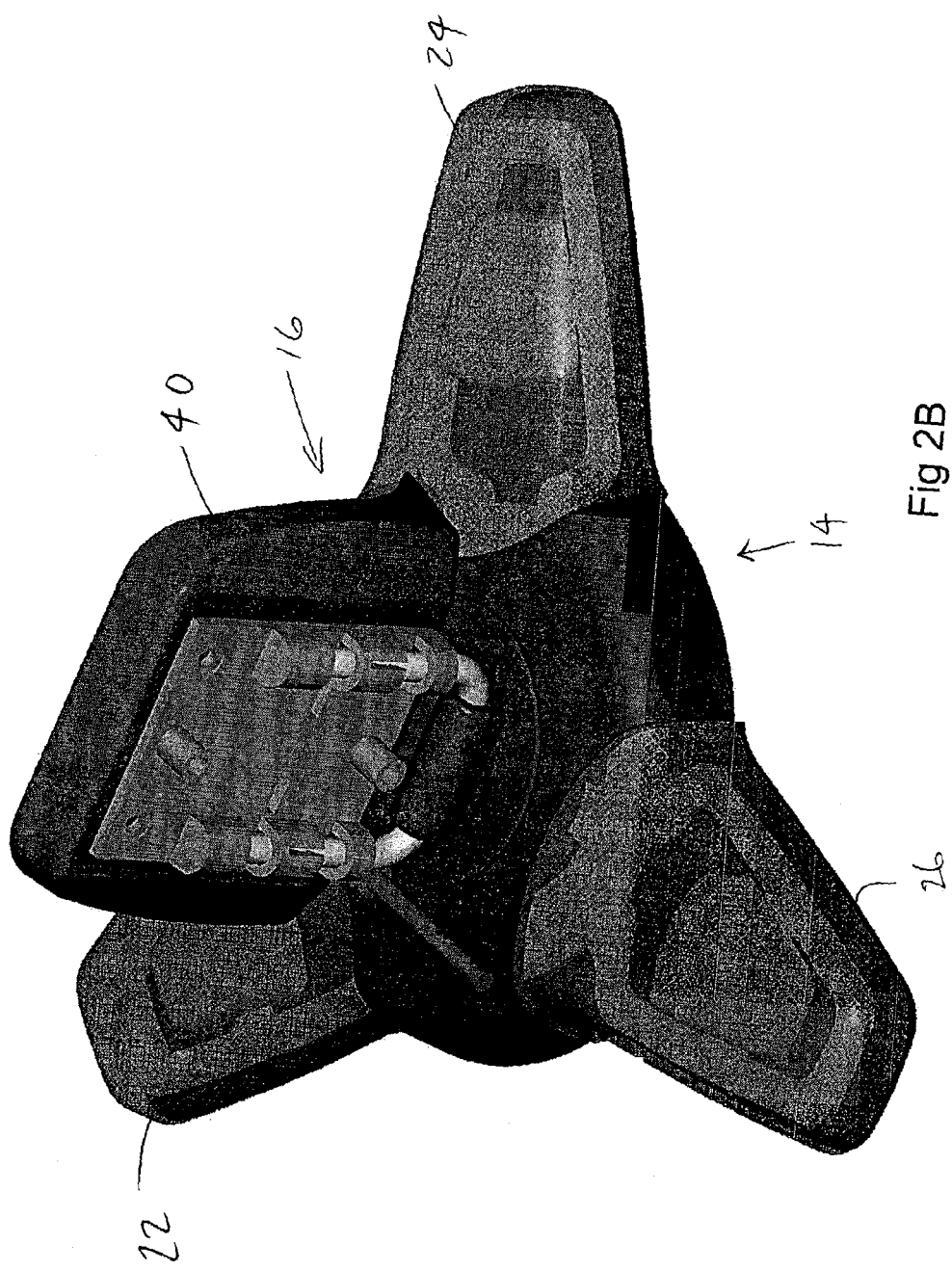
FIG. 2B is a rear view of the mounting apparatus of FIG. 2A.
Figure 3B:
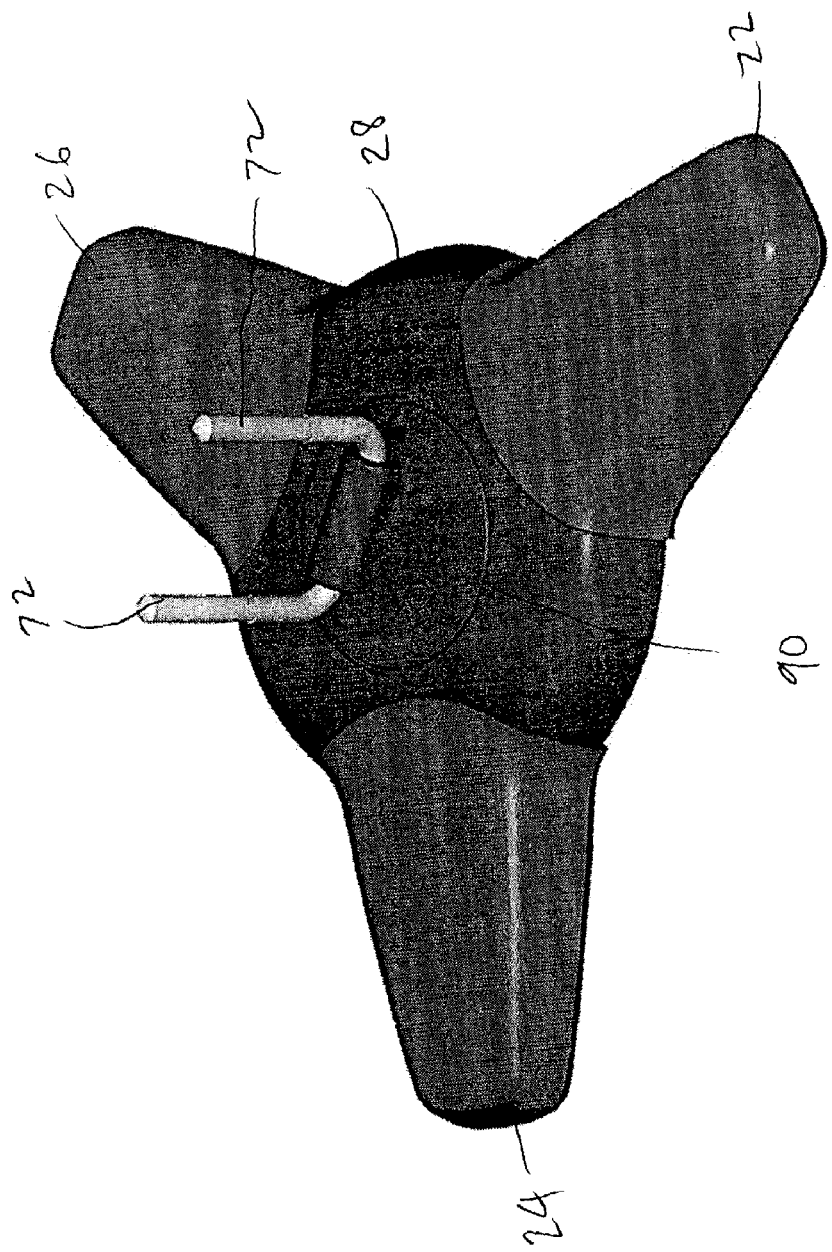
FIG. 3B is a perspective view of the mounting apparatus of FIG. 3A.

As depicted in FIGS. 2A–2B, the curved receiving member 40 is hingeably attached to the base 14. As illustrated in FIGS. 3A–3B, a pair of hinge assemblies 70 have a pivotable "L" shaped member 72. The anchor post 60 is mounted in the hole 30 in the base 14. The mounting cover 28 has a hole 80 which aligns with the anchor post 60 and the recess 30. A hinge cover 90 retains the hinge assemblies 70 and allows the "L" shaped members 72 to pivot.

As depicted in FIG. 4, the base 14 includes a gel assembly, generally indicated at 100, having a shape the same as the rubber mat 54 and which is formed as a uni-body construction. The alloy armature 58 has a three-pronged shaped which fits inside of the gel assembly 100. The alloy armature 58 has a plurality of shaped openings 102, 104 in each prong with a hole 106 therebetween. The metal weights 50 have a shaft extending downwardly which fit into hole 106 and are retained thereby. The gel assembly 100 has a plurality of shafts 110 in the opening 30. The shafts 110 extend through openings 112 in the alloy armature 58. The shafts 110 also extend into retaining shafts 120 in the anchor post 60. The anchor post 60 has a plurality of slots 122 which align with slots 124 in the mounting cover 28. The hinge assemblies 70 are fastened to the anchor post 60 by conventional methods. The "L" shaped arms extend through slots 128 in a hinge cap 130. A shorter portion 134 of the "L" shaped arms extends into a retaining portion 136 of the hinge assemblies 70. The retaining portions 136 are positioned in a trough of 140 in the hinge cap 128. Advantageously, the forms 72 are free to rotate relative to the hinge cap 128. The front cover on 50 is attached to a rear cover 152 with the arms 72 extending into round slots 154 to retain the front hinge cover 150. A rear hinge cover 152 is attached to the front hinge cover 150 by conventional methods.

In operation, when the assembly 10 is placed on a surface, each of the toes 22, 24, 26 can be shaped to conform to the contour and shape of a surface. The bending of the toes 22, 24, and 26 maximizes the contact between the base assembly 14 and a surface to reduce the amount of slipping that takes place. The weight of the weight 50 packs downwardly on the toes 22, 24, 26 to resist the movement of the base 14 once the base 14 is shaped to the contour of the surface. The weight of the entire assembly acts downwardly to establish a firm connection between the base 14 and the surface. Once the base 14 is positioned on the surface, the electronic device 12 is fit into the hinge assembly 16 and retained therein. The positioning of the electronic device 12 can be adjusted by the user so the user can easily view of the display of the electronic device (see FIG. 1) and access the buttons and knobs on the electronic device. The tab 46 can be used to selectively release the electronic device 12 from the hinge assembly 16.

The electronics mounting apparatus 10 can be moved to different locations without causing damage to the surface to which it was mounted. The apparatus 10 can be lifted from the surface, moved to a different location and placed on the surface in the new location. Once the base assembly 14 makes contact with the new surface, the toes 22, 24, 26 are bent and shaped to the contour of the new surface so that the base assembly 14 is in contact with the surface. The electronic device 12 can remain coupled to the electronics mounting apparatus 10 when the apparatus is moved to a different location. The electronic device 12 can be removed prior to moving the electronics mounting apparatus 10 and re-coupled to the hinge assembly 16 after the apparatus 10 has been moved to the new location.

Advantageously, the electronics mounting apparatus 10 is easy to assemble and configure, in part, because of the uni-body construction.

It will be readily seen by one of ordinary skill in the art that the present invention fulfills all the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. An apparatus mountable to a surface and for holding an electronic device, comprising:
   a mount assembly for holding the electronic device;
   a base including a lower portion mountable to the surface and an upper portion attached to said mount, wherein said base includes weights, a gel portion, and a mat to conform to the surface; and
   wherein said base has three toes, each of which has a weight.

2. The apparatus of claim 1, wherein said mount has integral power/data connections.

3. The apparatus of claim 1, wherein the weights are metal.

4. The apparatus of claim 1, wherein said base includes an alloy armature.

5. The apparatus of claim 1, wherein said mat is made of rubber.

6. The apparatus of claim 1, wherein said base includes a metal support sheet which extends throughout said base.

7. The apparatus of claim 1, wherein said mount assembly includes a pivotable hinge connected to said base.

8. The apparatus of claim 1, wherein said base has a uni-body construction.

9. The apparatus of claim 1, wherein said base is washable.

10. The apparatus of claim 1, wherein said weights are insert molded into said base.

11. The apparatus of claim 1, wherein said mount assembly is pivotable.

12. The apparatus of claim 1, wherein the surface is a curved dashboard of a vehicle.

13. The apparatus of claim 3, wherein the metal is lead and is cast into said gel portion.

14. The apparatus of claim 4, wherein said base includes a central anchor post.

15. The apparatus of claim 6, wherein said support sheet includes portions for engaging with said weights.

16. An apparatus mountable to a surface and for holding an electronic device, comprising:
   a mount assembly for holding the electronic device; and
   a base including a lower portion mountable to the surface and an upper portion attached to said mount, wherein said base includes weights, a gel portion, and a mat to conform to the surface;
   said base has a uni-body construction; and
   said mount assembly is pivotable.

17. The apparatus of claim 16, wherein said weights are insert molded into said base.

18. The apparatus of claim 16, wherein the surface is a curved dashboard of a vehicle.

19. An apparatus mountable to a surface and for holding an electronic device, comprising:
   a mount assembly for holding the electronic device; and
   a base including a lower portion mountable to the surface and an upper portion attached to said mount, wherein said base includes weights, a gel portion, and a mat to conform to the surface;
   said base has a uni-body construction;
   said mount assembly is pivotable; and
   said base includes a metal support sheet which extends throughout said base.

20. The apparatus of claim 19, wherein said weights are insert molded into said base.

21. The apparatus of claim 19, wherein said base includes an alloy armature.

22. The apparatus of claim 19, wherein the surface is a curved dashboard of a vehicle.

* * * * *